US006804771B1

(12) United States Patent
Jung et al.

(10) Patent No.: US 6,804,771 B1
(45) Date of Patent: Oct. 12, 2004

(54) PROCESSOR WITH REGISTER FILE ACCESSIBLE BY ROW COLUMN TO ACHIEVE DATA ARRAY TRANSPOSITION

(75) Inventors: Yoochang Jung, Seattle, WA (US); Stefan G. Berg, Seattle, WA (US); Donglok Kim, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 578 days.

(21) Appl. No.: 09/626,263

(22) Filed: Jul. 25, 2000

(51) Int. Cl.[7] .............................................. G06F 12/00
(52) U.S. Cl. ...................................... 712/220; 711/157
(58) Field of Search ......................... 712/220; 711/114, 711/157; 365/230.05, 230.06

(56) References Cited

U.S. PATENT DOCUMENTS

| | | | |
|---|---|---|---|
| 4,631,750 A | * 12/1986 | Gabriel et al. | 382/277 |
| 5,754,457 A | 5/1998 | Eitan et al. | 708/402 |
| 5,818,751 A | * 10/1998 | Ho et al. | 365/154 |
| 5,822,619 A | 10/1998 | Sidwell | 712/300 |
| 6,105,114 A | * 8/2000 | Okuno | 711/155 |
| 6,141,289 A | * 10/2000 | Amer | 365/230.05 |
| 6,392,954 B2 | * 5/2002 | Reddy et al. | 365/230.05 |
| 6,725,356 B2 | * 4/2004 | Hansen et al. | 712/210 |

OTHER PUBLICATIONS

Ratham et al., "Processing the New World of Interactive Media," IEEE Signal Processing Magazine 1058–5888/98; Mar. 1998.
Basoglu et al, "Single–Chip Processor for Media Applications: The MAP 1000" CCC 0899–9457/99/010096–11; John Wiley & Sons, Inc. 1999; pp 96–106.
Weste et al., "Principles of CMOS VLSI Design A Systems Perspective Second Edition," published by ATT, 1993, pp 580–583.
Rao et al., "Techniques & Standards for Image Video & Audio Encoding," publ. Prentice Hall PTR, 1996, pp 62–63.

* cited by examiner

*Primary Examiner*—Eric Coleman
(74) *Attorney, Agent, or Firm*—Steven P. Koda

(57) ABSTRACT

A processor including a transposable register file. The register file allows normal row-wise access to data and also allows a transposed column-wise access to data stored in a column among registers of the register file. In transposed access mode, a data operand is accessed in a given partition of each of n registers. One register stores a first partition. An adjacent register stores the second partition, and so forth for each of n partitions of the operand. A queue-based transposable register file also is implemented. The queue-based transposable register file includes a head pointer and a tail pointer and has a virtual register. Data written into the virtual register is written into one of the registers as selected by the head pointer. Data read from the virtual register is read from one of the registers as selected by the tail pointer.

34 Claims, 8 Drawing Sheets

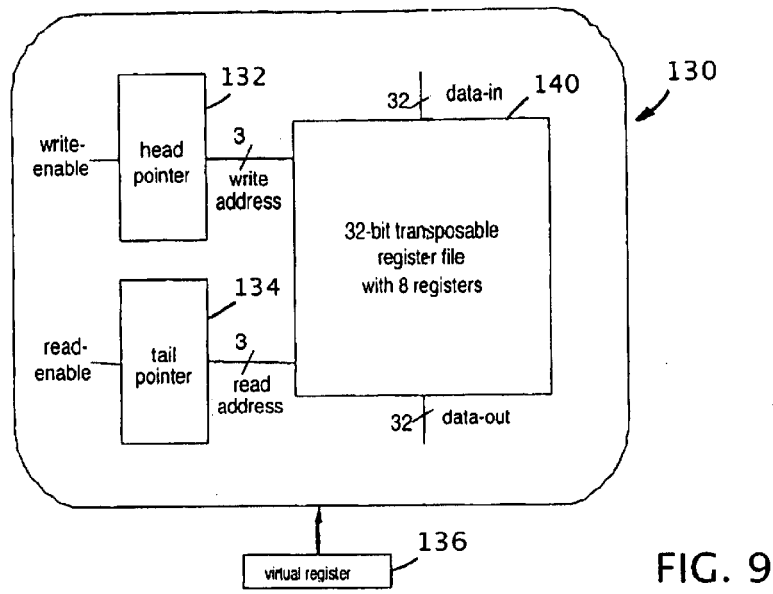

FIG. 9

```
01: // load eight 64-bit data, i.e., an 8x8 8-bit block.
02: bsld.64 r0, r32, 0;     /* r0 =  *r32 */
03: bsld64  r2, r32, 1;     /* r2 =  *(r32 +  8) */
04: bsld64  r4, r32, 2;     /* r4 =  *(r32 +  8 * 2) */
05: bsld64  r6, r32, 3;     /* r6 =  *(r32 +  8 * 3) */
06: bsld64  r8, r32, 4;     /* r8 =  *(r32 +  8 * 4) */
07: bsld64  r10, r32, 5;    /* r10 = *(r32 +  8 * 5) */
08: bsld64  r12, r32, 6;    /* r12 = *(r32 +  8 * 6) */
09: bsld64  r14, r32, 7;    /* r14 = *(r32 +  8 * 7) */

10: // transpose the block using
    //   16 shuffle and 8 combine instructions.

11: // store back the result
12: bsst64  r16, r33, 0;    /* r33 =     r16 */
13: bsst64  r18, r33, 1;    /* *(r33 +  8) = r18 */
14: bsst64  r20, r33, 2;    /* *(r33 +  8 * 2) = r20 */
15: bsst64  r22, r33, 3;    /* *(r33 +  8 * 3) = r22 */
16: bsst64  r24, r33, 4;    /* *(r33 +  8 * 4) = r24 */
17: bsst64  r26, r33, 5;    /* *(r33 +  8 * 5) = r26 */
18: bsst64  r28, r33, 6;    /* *(r33 +  8 * 6) = r28 */
19: bsst64  r30, r33, 7;    /* *(r33 +  8 * 7) = r30 */
```

FIG. 10

```
01: // load eight 64-bit data, i.e., an 8x8 8-bit blo
02: bsld.64   r0, r32, 0;    /* r0 = *r32 */
03: bsld.64   r2, r32, 1;    /* r2 = *(r32 + 8) */
04: bsld.64   r4, r32, 2;    /* r4 = *(r32 + 8 * 2) */
05: bsld.64   r6, r32, 3;    /* r6 = *(r32 + 8 * 3) */
06: bsld.64   r8, r32, 4;    /* r8 = *(r32 + 8 * 4) */
07: bsld.64  r10, r32, 5;    /* r10 = *(r32 + 8 * 5) */
08: bsld.64  r12, r32, 6;    /* r12 = *(r32 + 8 * 6) */
09: bsld.64  r14, r32, 7;    /* r14 = *(r32 + 8 * 7) */

10: // read out the data in transpose mode and store th
11: bsst.64   r0.t, r33, 0;  /* *r33 = r0 */
12: bsst.64   r2.t, r33, 1;  /* *(r33 + 8) = r2 */
13: bsst.64   r4.t, r33, 2;  /* *(r33 + 8 * 2) = r4 */
14: bsst.64   r6.t, r33, 3;  /* *(r33 + 8 * 3) = r6 */
15: bsst.64   r8.t, r33, 4;  /* *(r33 + 8 * 4) = r8 */
16: bsst.64  r10.t, r33, 5;  /* *(r33 + 8 * 5) = r10 */
17: bsst.64  r12.t, r33, 6;  /* *(r33 + 8 * 6) = r12 */
18: bsst.64  r14.t, r33, 7;  /* *(r33 + 8 * 7) = r14 */
```

PROCESSOR WITH REGISTER FILE ACCESSIBLE BY ROW COLUMN TO ACHIEVE DATA ARRAY TRANSPOSITION

BACKGROUND OF THE INVENTION

This invention relates to processor architecture and image processing applications, and more particularly to the register file(s) and instructions of a mediaprocessor.

Different computing applications place different demands on a processor. As a result, various microprocessor architectures have evolved to best handle specific type of applications. As it is not economical to have too many differing architectures, it also is desirable that a processor be able to serve many types of processing needs.

Accordingly, there are at least two common types of architectures for handling complex data applications such as image processing applications. There are single instruction multiple data (SIMD) processor architectures and very long instruction word (VLIW) processor architectures. Mediaprocessors with instructions adapted for complex image processing tasks can utilize both the SIMD architecture and VLIW architecture.

When executing image processing tasks it is common to perform two-dimensional convolutions and two-dimensional transforms, such as wavelet transforms, discrete cosine transforms and fast fourier transforms. One strategy for reducing the computation requirements of such algorithms is to implement the algorithm in two separable passes of one dimensional processing (e.g., row-wise processing followed by column-wise processing). For example, the number of multiplications of a direct N×N two dimensional discrete cosine transform is $N^4$, while it is $2N^3$ when separable one dimensional discrete cosine transforms are executed.

Many image and video processing algorithms handle data elements that are small in size. Mediaprocessors take advantage of this property by employing partitioned instructions that simultaneously process multiple data elements packed into one register.

Referring to FIG. 1, an exemplary SIMD partitioned-add instruction is implemented as eight 8-bit additions 11–18 executed in parallel using a 64-bit data path. In a discrete cosine transform algorithm partitioned instructions are used for an array of image data as a first pass process in one dimension. The process then is to be repeated in a second, orthogonal dimension. Referring to FIG. 2, a first data set 20 with rows 'j' and columns 'i' is processed in row-wise fashion to achieve a resulting data set 22. To process the data set 22 along the orthogonal dimension the array is transposed using a series of processing instructions to achieve data set 22'. The end result of the instructions is to reload the data so that the data as stored in the processor registers correspond to columns of the data set 22, rather than to rows. The data is processed for the second dimension to achieve data set 24. The result then is transposed again to achieve data set 24'. The initial data set 20 now has been processed in row-wise and column-wise fashion to perform the two-dimensional processing. For a typical RISC architecture it takes approximately 112 instructions (56 loads and 56 stores) to transpose an 8×8 eight-bit data array. The MAP1000 mediaprocessor includes instructions allowing an 8×8 eight-bit block to be transposed in 40 instructions using one cluster. The transposition of an array occurs often and consumes many clock cycles. Accordingly, an efficient manner of transposing an array of data is needed.

SUMMARY OF THE INVENTION

According to the invention, a processor includes a register file which allows normal row-wise access to data stored in registers of the register file and also allows a transposed column-wise access to data stored in a column among registers of the register file.

According to one aspect of the invention, a row of data stored in a register of the register file forms n partitions of m-bits of data per partition, (i.e., a given register stores n * m bits). In transposed access mode, an n * m bit data operand is accessed in a given partition of each of n registers. Thus, one register stores a first partition of the data operand. An adjacent register stores the second partition of the data operand, and so forth for each of the n partitions of the operand.

According to another aspect of the invention, a queue-based transposable register file is implemented. The transposable register file include a head pointer and a tail pointer and has a virtual register. Data written into the virtual register is written into one of the registers of the transposable register file as selected by the head pointer. Data read from the virtual register is read from one of the registers of the transposable register file as selected by the tail pointer.

An advantage of the transposable register file is that for many image processing and other applications where data transposition is required, the processing can be performed with transposing the data with software instructions, then reloading the transposed data into the normal register file. As a result, a significant amount of processing overhead is eliminated for many of such image processing tasks. These and other aspects and advantages of the invention will be better understood by reference to the following detailed description taken in conjunction with the accompanying drawings.

BRIEF DESCRIPTION OF THE DRAWINGS

FIG. 9 is a block diagram of a queue-based transposable register file according to an embodiment of this invention;

FIG. 10 is a listing of instructions for an 8×8 8-bit image transposition process without using a transposable register file;

DESCRIPTION OF SPECIFIC EMBODIMENTS

Figure 1:
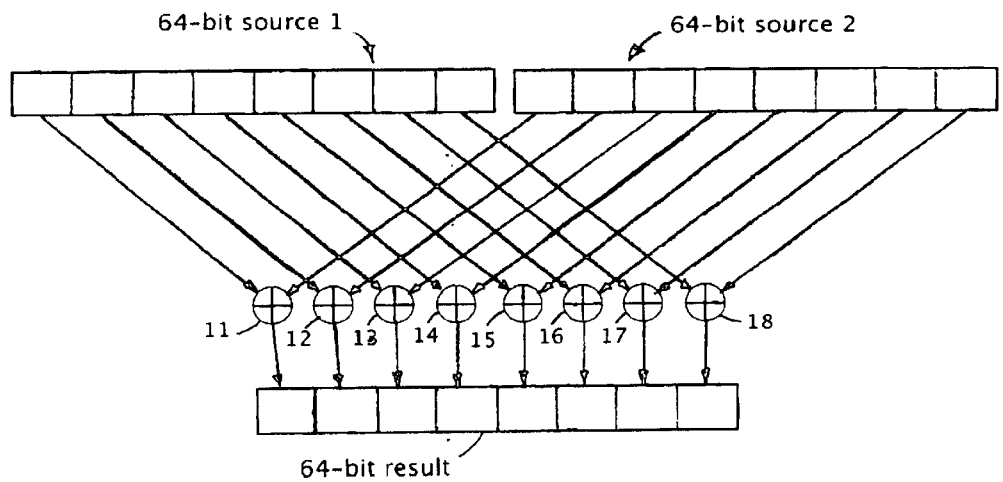
FIG. 1 is a block diagram of a SIMD partitioned-add instruction implemented as eight 8-bit additions executed in parallel using a 64-bit data path.
Figure 2:
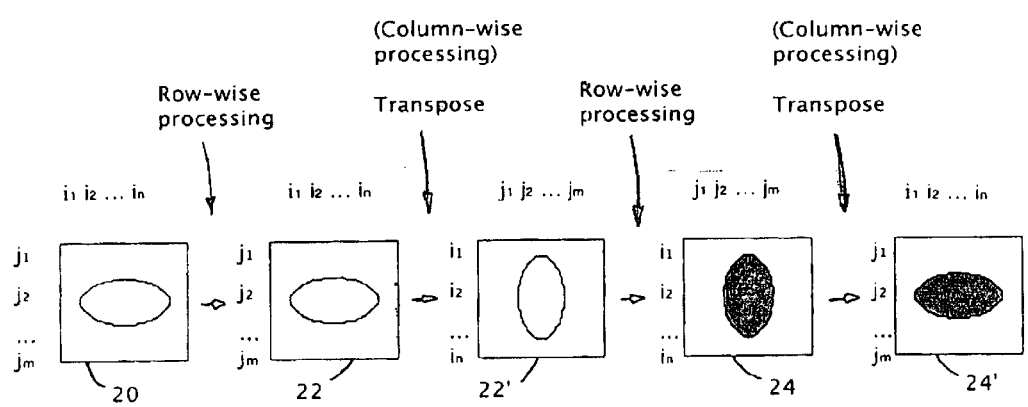
FIG. 2 is a sequence of data sets undergoing row-wise processing, transposition, row-wise processing again and another transposition to achieve a desired transformation of the data set.
Figure 3:
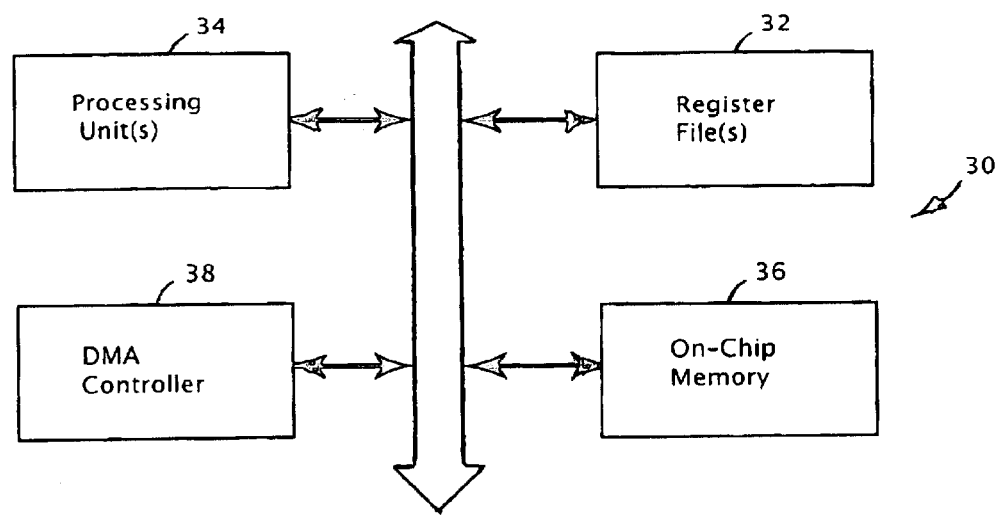
FIG. 3 is a block diagram of a processor having a transposable register file according to an embodiment of this invention.

FIG. 3 shows a block diagram of a processor 30 which embodies a register file 32 according to an embodiment of this invention. The processor 30 includes one or more processing units 34, one or more register files 32, on-chip memory 36 and a direct memory access controller 38. The processor 30 typically is part of a computing system which includes main memory (not shown). The processor 30 perform computing tasks on data received from main memory and stored in the on-chip memory 36.

A processor instruction includes an instruction operand and one or more source operands. The source operands are data loaded from on-chip memory 36 into respective registers of the register file 32. The processor performs a computation on the source operands and stores a result in a destination operand, also in the register file 32. The result then is moved into on-chip memory 36 and then output from the processor 30, (e.g., to main memory, to a peripheral device or some other output destination). In various embodiments the processor 30 is based on a SIMD architecture, a VLIW architecture, a RISC architecture, or a combination of such architectures.

In various embodiments the register file 32 is a transposable register file or includes a normal register file and a transposable register file. Various embodiments of a transposable register file are described below.

Hardware-Based Transposable Register File

Figure 4:
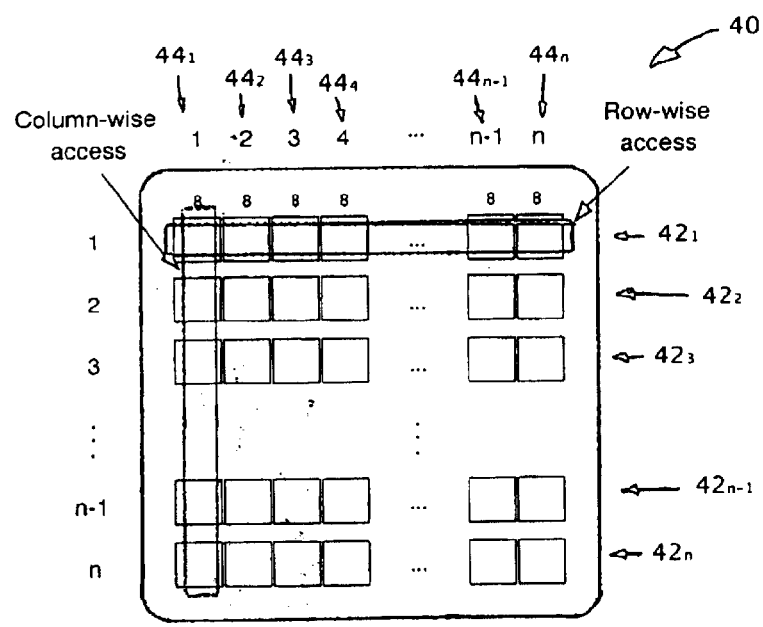
FIG. 4 is a logical diagram depicting access of a transposable register file according to an embodiment of this invention.

Referring to FIG. 4, a transposable register file 40 includes n registers 42. Each register 42 includes n 8-bit blocks 44 of data, i.e., n×8-bit register. There are two access modes: normal and transposed. The register blocks 44 are accessed row-wise in the normal access mode. Specifically, an operand is accessed from a given row $42_i$. For example where n=8 each register is 64 bits wide. An exemplary 64-bit source operand is stored in the eight blocks $44_1$, through $44_8$ of a given row $42_i$. The register blocks 44 are accessed column-wise in the transposed access mode. Specifically, the operand is accessed from a given column $44_i$. For example where n=8, there are 8 registers. An exemplary 64-bit source operand is stored in the eight blocks $44_i$ of the eight rows $42_1$, to $42_8$. Note that n registers are used to transpose n×n—eight-bit blocks of data. This 8-bit grouping of data is desirable for 8-bit data used in image and video processing.

Figure 5:
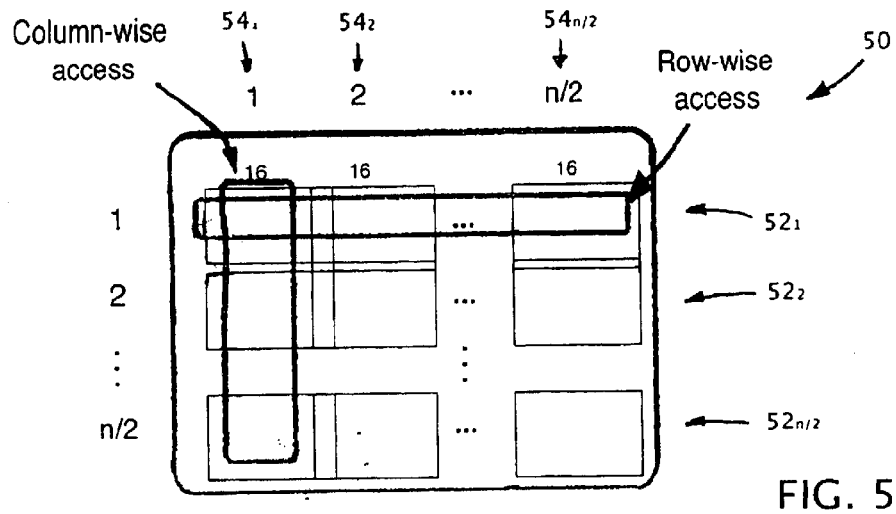
FIG. 5 is a logical diagram depicting access to a transposable register file according to another embodiment of this invention.

In image and video processing, however, 16-bit data also are frequently used. Referring to FIG. 5, a transposable register file 50 allows 16-bit column-wise access. Each register 52 includes n/2 16-bit blocks 54 of data, i.e., n2×16-bit register. For normal row-wise 8-bit access or 16-bit access, access is performed in a conventional manner. In normal access mode an operand is accessed from a given row $52_i$. For example where n=8 each register is 64 bits wide. An exemplary 64-bit source operand is stored in the four blocks $54_1$, through $54_4$ (i.e., n/2=4) of a given row $52_i$.

For access in a transposed mode n/2 registers 52 (n should be even) are present. This compares to the n registers used for transposed access of the 8-bit transposable register file 40. The register blocks 54 are accessed column-wise in the transposed access mode. Specifically, the operand is accessed from a given column $54_i$. For example where n=8, there are n/2=4 registers 52. An exemplary 64-bit source operand is stored in the n/2=4 blocks $54_i$ of the four rows 521 to 524.

Consider the combinations for performing a write operation followed by a read operation. There are four potential combination: (i) normal access mode write followed a normal access mode read; (ii) normal access mode write followed by a transposed access mode read; (iii) transposed access mode write followed by a normal access mode read; and (iv) transposed access mode write followed by a transposed accessed mode read. Although all these modes could be utilized, the same results can be achieved in an embodiment which performs just two of these four possible combinations. Specifically, allowing for just one of the combination (ii) the normal access mode write followed by a transposed access mode read, and (iii) transposed access mode write followed by a normal access mode read is effective. The transposed result is achieved for either of combinations (ii) or (iii), (i.e., whenever the read and write access modes are different). Similarly, the same result is achieved for the combinations (i) and (iv).

Figure 6:
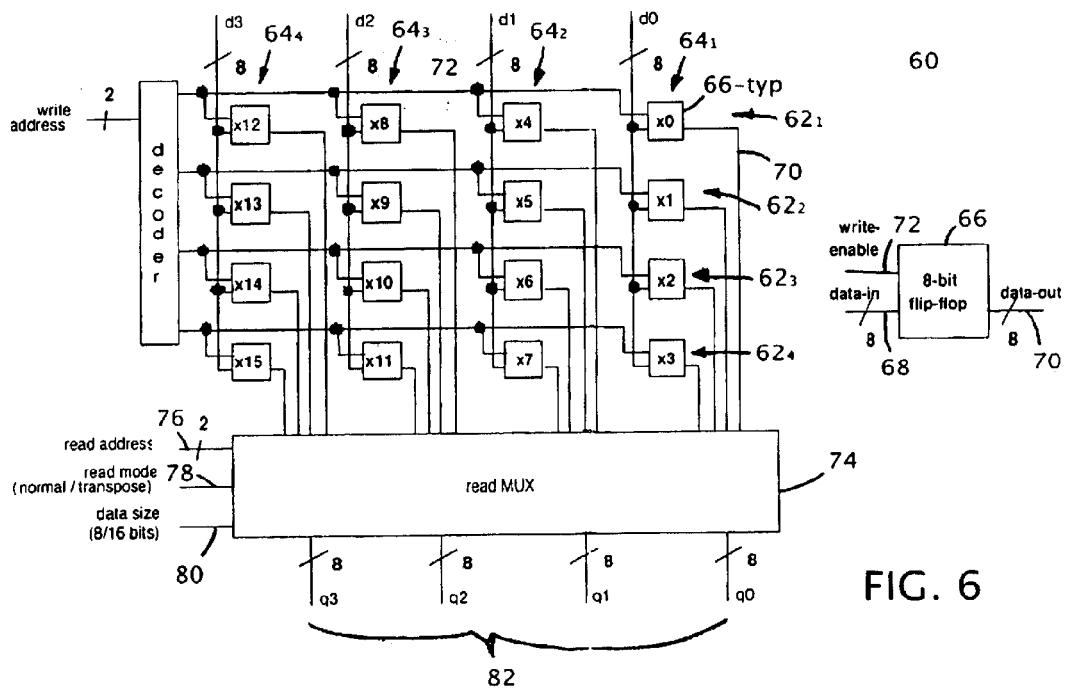
FIG. 6 is a logical block diagram of a transposable register file according to an embodiment of this invention.

Referring to FIG. 6, a 32-bit transposable register file 60 with 8-bit partitions is configured to provide the combinations (i) normal access mode write followed by a transposed access mode read, and (ii) a normal access mode write followed by a normal access mode read. To support these combinations, the register file has the capabilities of normal access mode writes and both normal and transposed access mode reads. For normal access mode, each 32-bit register 62 is formed by a row of four 8-bit flip-flops 66. Each 8-bit flip-flop 66 (x0 through x15) has three signal groups: 8-bit data-in 68, 8-bit data-out 70, and write-enable 72. With support for only a normal access mode write operation, each write-enable signal 72 controls all the flip-flops 66 in the same row $62_i$ and each 8-bit data-in signal 68 is connected to the flip-flops 66 in the same column $64_i$. To provide the capability of a normal access mode read operation and a transposed access mode read, all data-out signals 70 are connected to a read MUX 74. When reading, the read address signal 76, read mode signal 78, and data size signal 80 control the read MUX 74. The output data 82 (q0 to q3) are determined by these control signals 76–80.

Table 1 shows the selected flip-flops 66 in each combination of data size, read mode, and read address. In this architecture it is the read MUX 74 which provides the transposable capability. Note that 2×2 16-bit transposition is achieved for the first two rows $62_1$, and $62_2$.

TABLE 1

Selected Flip-Flops When Accessing The Register File

| | | | Selected Flip-flops | | | |
|---|---|---|---|---|---|---|
| Data size | Read mode | Read address | q3 | q2 | q1 | q0 |
| 8 | normal | 0 | x12 | x8 | x4 | x0 |
| | | 1 | x13 | x9 | x5 | x1 |
| | | 2 | x14 | x10 | x6 | x2 |
| | | 3 | x15 | x11 | x7 | x3 |
| | Transpose (8 bits, 4 × 4) | 0 | x12 | x13 | x14 | x15 |
| | | 1 | x8 | x9 | x10 | x11 |

TABLE 1-continued

Selected Flip-Flops When Accessing The Register File

| Data size | Read mode | Read address | Selected Flip-flops | | | |
|---|---|---|---|---|---|---|
| | | | q3 | q2 | q1 | q0 |
| | | 2 | x4 | x5 | x6 | x7 |
| | | 3 | x0 | x1 | x2 | x3 |
| 16 | normal | 0 | x12 | x8 | x4 | x0 |
| | | 1 | x13 | x9 | x5 | x1 |
| | | 2 | x14 | x10 | x6 | x2 |
| | | 3 | x15 | x11 | x7 | x3 |
| | Transpose | 0 | x12 | x8 | x13 | x9 |
| | (16 bits, 4 × 4) | 1 | x4 | x0 | x5 | x1 |
| | | 2 | x14 | x10 | x6 | x2 |
| | | 3 | x15 | x11 | x7 | x3 |

Figure 7:
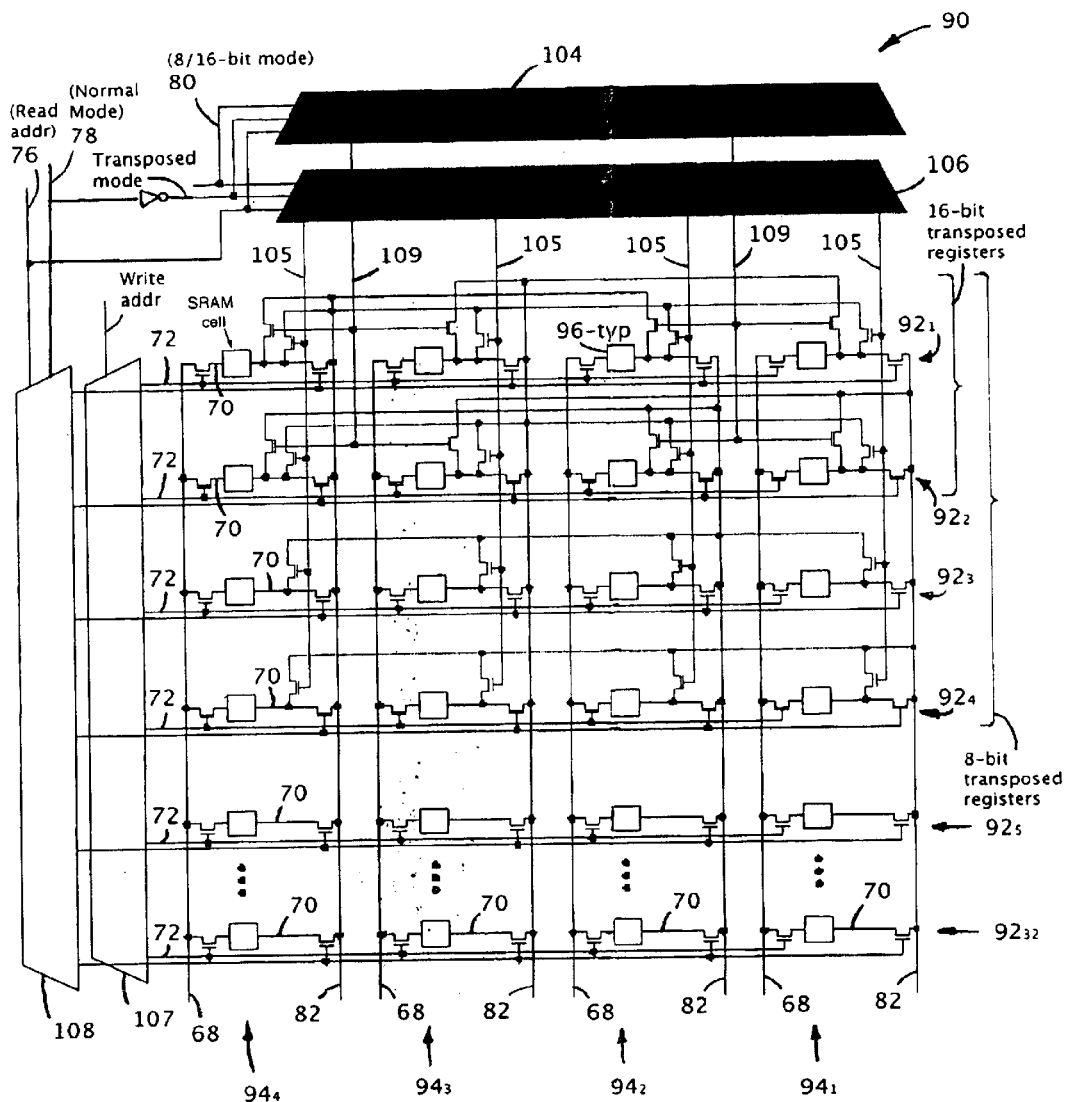
FIG. 7 is a high-level schematic diagram of a transposable register file allowing transposed access for a read operation according to an embodiment of this invention.
Figure 8:
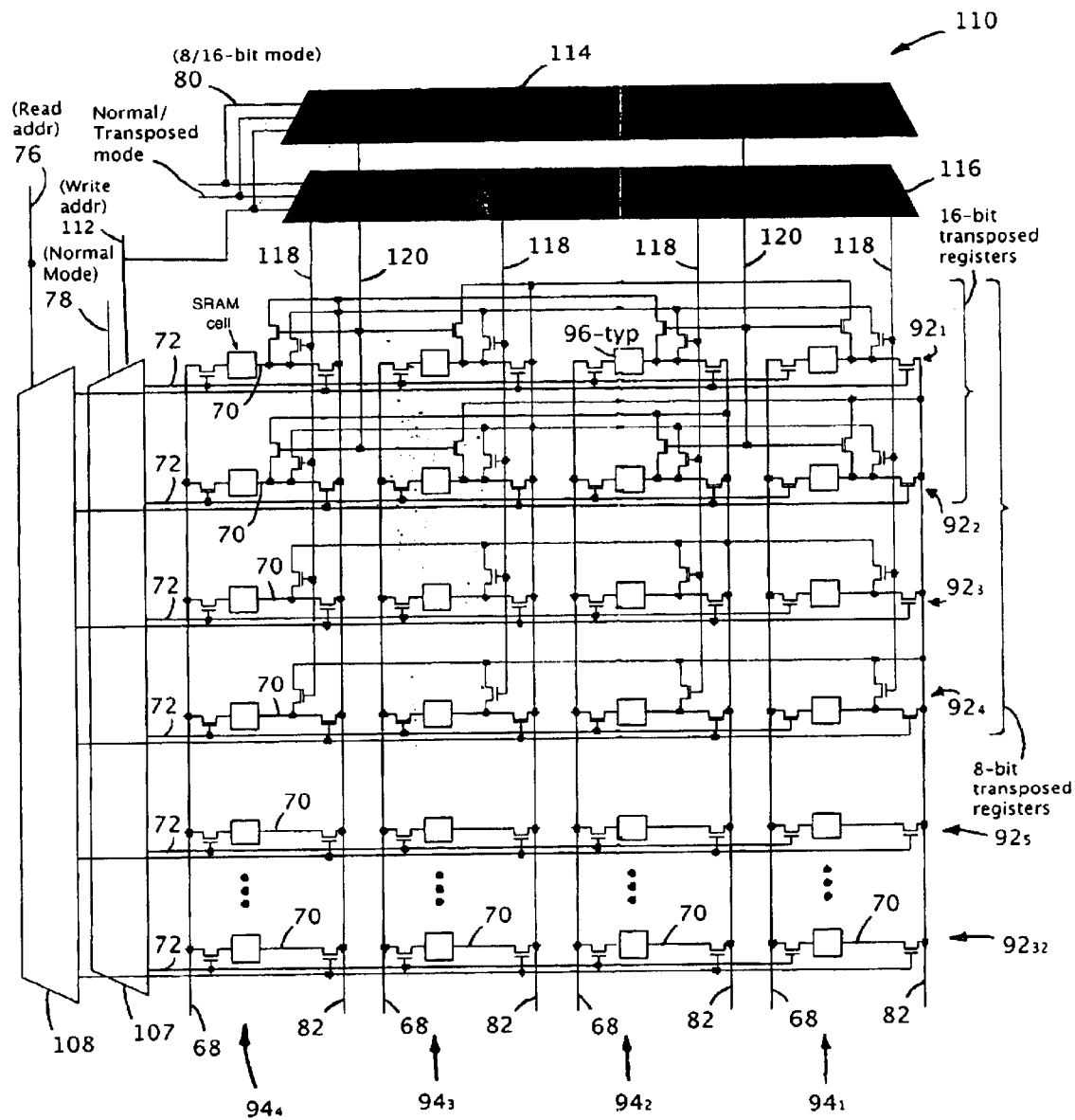
FIG. 8 is a high-level schematic diagram of a transposable register file allowing transposed access for a write operation according to an embodiment of this invention.

Referring to FIG. 7, a 32-bit transposable register file 90 having 32 registers $92_1$ to $92_{32}$ is shown for an SRAM embodiment. In this embodiment, the read accesses may be normal or transposed, while the write accesses are normal. Referring to FIG. 8, a similar transposable register file 110 is shown where write accesses may be normal or transposed and read operations are normal. Part numbers having the same function as in FIG. 6 are given the same part numbers.

Even though there are many possible implementation techniques, the implementation shown in FIG. 7 is based on a design for a dual-ported register file with separate read and write ports. To reduce the complexity in the figure, eight bits are combined into one SRAM cell 96. A row of four 8-bit SRAM cells 96 forms a register 92 with register 0 at the top. When reading from register 3, for example, the fourth row of SRAM cells will be selected by the read address decoder 108 while all other rows remain inactive. The register contents will appear on the data-out wires 82 at the bottom of the FIG. 7. Each cell 96 has three signal groups: 8-bit data-in 68, 8-bit data-out 70, and write-enable 72. Controls including a data size signal 80, a read mode signal 78 and a read address signal 76 control the 16-bit transposed access mode read address decoder 104, the 8-bit transposed access mode read address decoder 106, and the normal access mode read address decoder 108. Also included is a normal access mode write address decoder 107.

The register file 90 is operable for 8-bit partitions and 16-bit partitions. For 8-bit partitions n=4. Accordingly, four of the registers 92 are transposable. In normal access mode the transposable registers $92_1$ to $92_4$ are accessed normally as a given row $92_i$. In transposed access mode the source operand is located in four columns 94 of partitions. In a specific embodiment registers $92_1$ to $92_4$ are the transposable registers for the 8-bit partitioned operations. In normal access mode a 32-bit operand fills one of the registers $92_1$ to $92_4$. In transposed access mode the 32-bit operand is located in the 8-bit partitions in column 'i' of registers $92_1$ to $92_4$.

The enabling component for the 8-bit transpose read mode is the 8-bit transposed read address decoder 106. Instead of selecting a row 92 of SRAM cells 96, the enable lines 105 of the decoder 106 select a column 94 of SRAM cells 96 that contain the transposed values. The data-out values from the SRAM cells 96 in the selected column $94_i$ are connected to the correct data-out wires 82 of the normal read port. For example, when accessing the transposed register $94_4$, data-out 31 . . . 24 are driven by the top-most SRAM cell, data-out 23 . . . 16 by the second SRAM cell, data-out 15 . . . 8 by the third SRAM cell and data-out 7 . . . 0 by the last SRAM cell.

For 16bit partitions n/2=2. Accordingly, up to two of the registers 92 are transposable. In normal access mode the transposable registers are accessed normally as a given row $92_i$. In transposed access mode the source operand is located in two columns 94 of partitions. Because each operand is 32 bits, not all eight bit blocks $94_i$ in a given column 'i' are used for a given operand. In a specific embodiment registers $92_1$ to $92_2$ are the transposable registers for the 16-bit partitioned operations. In normal access mode a 32-bit operand fills one of the registers $92_1$ and $92_2$. In transposed access mode two SRAM cells in a given column $94_i$ are combined to form a single 16-bit partition. Thus, the 32-bit operand is located in two 16-bit partitions in column 'i' spanning two registers $92_1$ to $92_2$. Because not all the registers are used for transposition operations, in one embodiment the added decoders 104, 106 are only coupled to the registers which participate in a transposed access operation.

Similar to the 8-bit access mode, a 16-bit read address decoder 104 selects with enable lines 109 one of the two 16-bit transposed registers, e.g., either the two left halves of $92_1$ and $92_2$ or the two right halves of $92_1$ and $92_2$. The data-out values of the SRAM cells correctly connect to the data-out wires 82 of the normal read port.

The circuit shown in FIG. 7 is just one of several possible embodiments to implement the transposable register file. In the embodiment of FIG. 7, registers $92_5$ through $92_{32}$ are normal registers and are not accessed transposably. In other implementation, alternative or additional registers can be accessed transposably. When there are multiple transposable blocks, double buffering of data can be used to better pipeline the computation.

For example in 64-bit embodiments, 8-bit transposed access would encompass eight registers, while 16-bit transposed access would encompass four registers.

Referring to FIG. 8, a similar transposable register file 110 is shown where write accesses may be normal or transposed and read operations are normal. Like for register file 90 transposing is performed using either 8-bit or 16-bit partitions. Like parts are given the same part numbers and perform the same functions. The operation for the normal-write port 107 is identical to that of the transposed-read register file shown in FIG. 7. For example, when writing into register $92_3$ of FIG. 8, the data is written to the third row of the SRAM cells 96 selected by the write address decoder 107. The register file 110 includes an 8-bit transposed access mode write address decoders 116 and a 16-bit transposed access mode write address decoders 114 having enable lines 118 and 120, respectively. The write transposable register file 110 operates in a similar manner to the read-transposable register file but with a write transposition access mode, rather than a read transposition access mode.

Queue-Based Transposable Register File

A register file allowing transposed access avoids the time-consuming steps to transpose and reload data into a conventional register file which occurs for many fundamental operations. However, implementation of the transposable register file increases the pressure for more registers. When the data width increases, the required number of registers of the transposable register file increases in proportion to the number of partitions in one register. For example, in a 64-bit architecture, 8 registers are used to transpose an 8×8 8-bit data block. In a 256-bit architecture, 32 registers would be used to transpose a 32×32 8-bit data block. These 32 registers, being allocated, are not available for use for other purposes during transposition. (In some embodiments the instruction word may be widened to accommodate the transposition mode bit(s)). In addition, due to the latency between writing and reading the register file caused by a processor pipeline, the transposed data is not able to be read right after issuing an instruction that writes a result to the register file. In many applications, these difficulties can be avoided based upon appropriate scheduling of the output order. In an alternative embodiment, however, these difficulties are avoided by implementing the transposable register file as a queue-based register file. The computing system in such instance may include both the queue-based register file and a conventional register file.

Referring to FIG. 9, the queue-based transposable register file 130 includes a transposable register file 140 of a type previously described above (e.g., register file 40, 50 60, 90, or 110), along with a head pointer 132 and a tail pointer 134. In one embodiment the register file 140 is a 32-bit transposable register file having 8 registers. The queue 130 is mapped into one virtual register 136 which is used as a source and destination register for an instruction. The actual destination register is one of the registers in the register file 140 as determined by the head pointer 132. Similarly, the actual source register is another one of the registers in the register file 140 as determined by the tail pointer 134. When a data item is written into the virtual register 136, (i.e., acting as a destination register), the data item is stored in the register of register file 140 pointed to by the head pointer 132. The head pointer is incremented by 1 to point to the next register in the register file 140. When a data item is read from the virtual register, the value to be read is a value stored in a register of the register file 140 pointed to by the tail pointer 134. The tail pointer then is incremented by 1 to point to the next register in the register file. Both the head pointer 132 and tail pointer 134 are circular so that they point to one of the 8 registers and roll over after the 8th register to point to the first register.

Note that the register file 140 includes 8 registers instead of the four which would be needed to implement a transposable register file for a 32-bit register having 4 8-bit partitions. The extra registers reduce the effect of instruction latencies, i.e., the number of cycles needed before reading a register after issuing an instruction whose destination is the register, by utilizing double buffering. For example, while data is loaded into the second half registers, the first half registers are already ready for use. Compared to the queue-based transposable register file shown in FIG. 9, it is difficult to double the number of transposable registers for double buffering in a normal transposable register file 90 since the register pressure increases as well.

Experimental Results

An image transpose is a common example that is performed in many 2D separable algorithms. Referring to FIG. 10, instructions 144 for an 8×8 8-bit block transpose without using a transposable register file is shown. Consider two instructions used for memory access: bsld.64 is a 64-bit load instruction in big endian, which takes 3 parameters, i.e., a destination register, a pointer register and an offset that is added to the pointer register to generate the effective address. The unit of the offset is 64 bits, e.g., the offset of 1 (line 3) indicates the second 64-bit data from the pointer. bsst.64 is a 64-bit store instruction in big endian where the first parameter works as a source register.

Figures 11, 12:
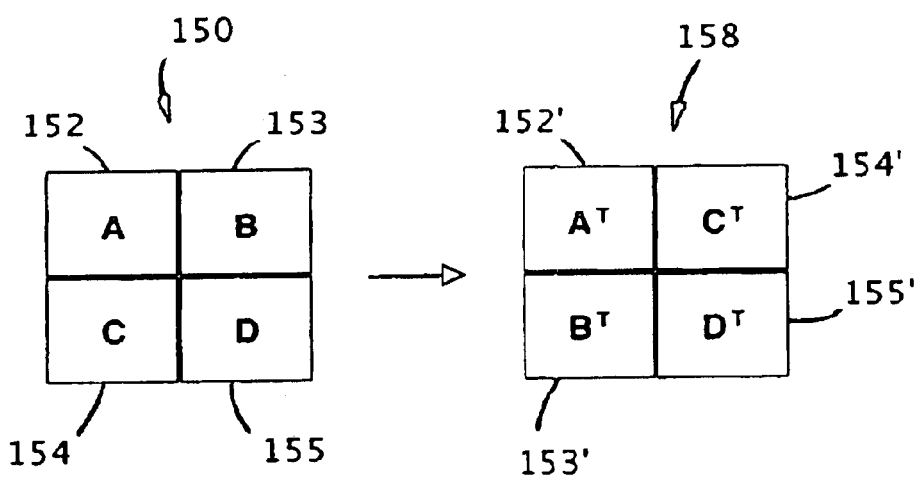
FIG. 11 is a listing of instructions for the 8×8 8-bit image transposition process as modified to use a transposable register file.
FIG. 12 is a diagram of an oversized image transposed piecewise to achieve a transposed image.

The instruction perform the following tasks: (i) load of a data block that consists of eight 64-bit memory words, (ii) transpose the block using 16 shuffle and 8 combine instructions, and then (iii) store the result back to memory. Referring to FIG. 11, a similar set of instructions 146 accomplish the same 8×8 block transposition, but with the transposable register file 90. The register file is accessed transposably when a postfix t is used, e.g., r0.t. In the example of FIG. 11, no instructions are needed or used for transposition compared to 24 instructions which are used to accomplish the transposition in FIG. 10. In these examples only one MAP1000 cluster is being used.

In another example, an image is transposed, whose size does not fit in the transposable register file 90. Referring to FIG. 12 to transpose the image 150, the image is divided into several smaller blocks 152–155. Each block is of a size that fits in the transposable register file 90. Each block then is transposed. The resulting transposed blocks 152'–155' then are rearrange to achieve the transposed image 158.

Figure 13:
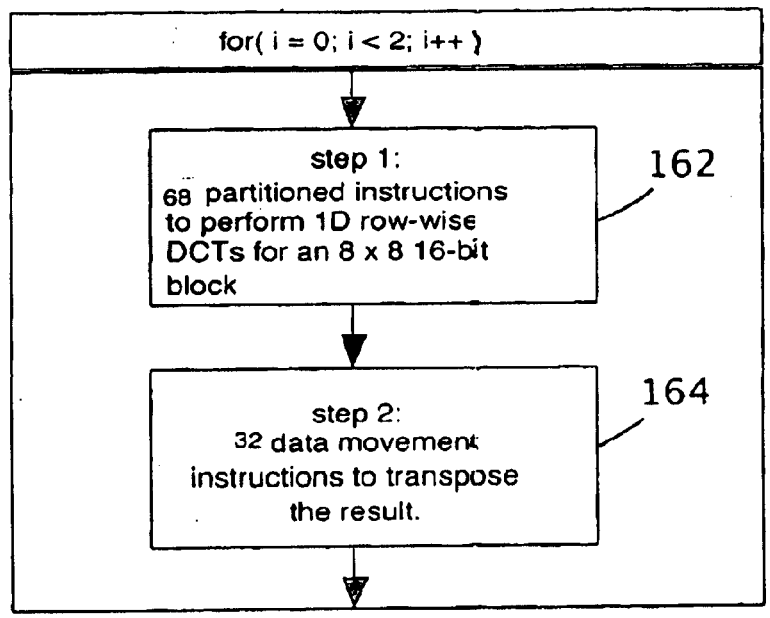
FIG. 13 is a flow chart of an 8×8 16-bit block discrete cosine transformation process without using a transposable register file.
Figure 14:
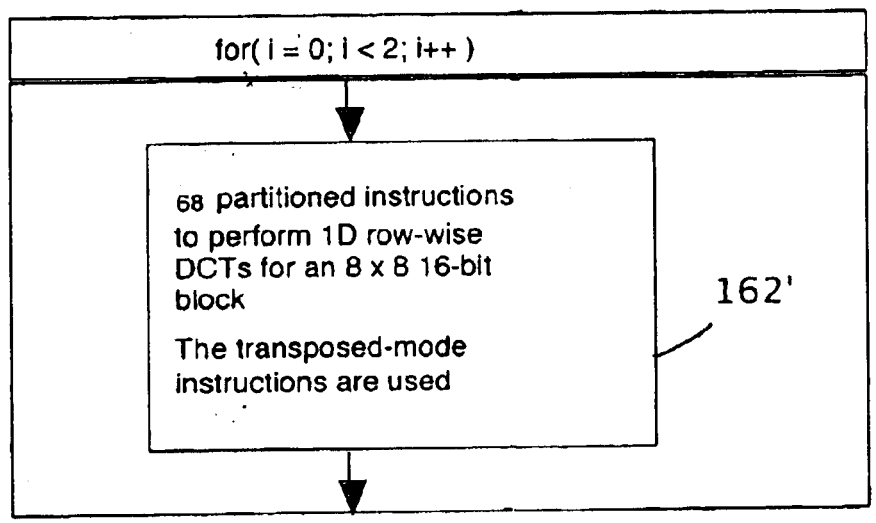
FIG. 14 is a flow chart of an 8×8 16-bit block discrete cosine transformation process as modified to use a transposable register file.

In another example, an 8×8 16-bit block discrete cosine transform ('DCT') is performed. When all the data fit within the transposable register file, then no transposition instructions are required. In an 8×8 16-bit 2D DCT implementation using the Chen's algorithm on a MAP1000 processor without using a transposable register file. Since a 2D DCT is separable, the 2D DCT is computed by performing 1D row-wise DCTs and two transpositions. Referring to FIG. 13, in the first iteration, 1D DCTs are performed for the 8×8 16-bit input data at step 162, and then transpose the result at step 164. Next, these steps are repeated. In this example, two transpositions take 64 instructions out of the total of 200 instructions required for an 8×8 2D DCT using one cluster. To perform the same task using a transposable register file, instead of software instruction to transpose and reload the data, the transposition instructions are omitted and transposed mode access is used in executing the 1D row-wise instructions during the second iteration of step 162' as shown in FIG. 14.

Table 2 below compares the number of operations taken for the 8×8 8-bit image transpose example and the 8×8 16-bit Chen's DCT discussed above. In the image transpose example, the number of operations without the transposable register file is 2.5 times more than that with the transposable register file. In the DCT example, the ratio is 1.47:1—a reduction of 32% in the number of operations.

TABLE 2

Comparison of the number of instructions between the two approaches.

| Examples | Without transposable register file | With transposable register file | Ratio |
| --- | --- | --- | --- |
| 8 × 8 8-bit transpose | 40 | 16 | 2.5:1 |
| 8 × 8 16-bit Chen's DCT | 200 | 136 | 1.47:1 |

Meritorious and Advantageous Effects

An advantage of the transposable register file is that for many image processing and other applications where data transposition is required, the processing can be performed with transposing the data with software instructions, then reloading the transposed data into the normal register file. As a result, a significant amount of processing overhead is eliminated for many of such image processing tasks.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A processor for executing instructions, the processor comprising:

a processing unit; and a register file having a normal access mode and a transposed access mode for accessing an operand, the register file comprising:

an array of storage areas for storing at least one operand for said instructions, wherein the array is organized into a plurality of rows of storage areas and a plurality of columns of storage areas, said at least one operand occupying a plurality of storage areas, wherein each storage area of said plurality of storage areas includes a common plural number of bits;

a first decoder for selecting all storage areas in an addressed row of storage areas during normal access mode; and a second decoder for selecting all storage areas in an addressed column of storage areas during transposed access mode, wherein for any operation of a read operation and a write operation one of either the normal access mode and transposed access mode is implemented allowing not more than one of either the first decoder and second decoder to be active to concurrently address multiple storage areas among the array of storage areas to access a given operand, wherein said addressed multiple storage areas for the given operand are along a common row during normal access mode and are along a common column during transposed access mode.

2. The processor of claim 1, wherein the first decoder is a read address decoder and the second decoder is a read address decoder, wherein for said read operation only one of the first decoder and second decoder is active to address storage areas among the array of storage areas, and wherein for a write operation none of the first decoder and second decoder are active.

3. The processor of claim 1, wherein the first decoder is a write address decoder and the second decoder is a write address decoder, wherein for said write operation only one of the first decoder and second decoder is active to address storage areas among the array of storage areas, and wherein for a read operation none of the first decoder and second decoder are active.

4. The processor of claim 1, in which the register file further comprises a third decoder for selecting all storage areas in an addressed row of storage areas.

5. The processor of claim 4, wherein the first decoder is a write address decoder and the second decoder is a write address decoder, wherein for said write operation only one of the first decoder and second decoder is active to address storage areas among the array of storage areas, and wherein for a read operation the third decoder is active.

6. The processor of claim 5, wherein for the read operation the third decoder is active and none of the first decoder and second decoder are active.

7. The processor of claim 1, in which the register file further comprises a third decoder for selecting all storage areas in an addressed column of storage areas.

8. The processor of claim 7, wherein the first decoder is a write address decoder and the second decoder is a write address decoder, wherein for said write operation only one of the first decoder and second decoder is active to address storage areas among the array of storage areas, and wherein for a read operation the third decoder is active.

9. The processor of claim 8, wherein for the read operation the third decoder is active and none of the first decoder and second decoder are active.

10. The processor of claim 1, further comprising an instruction operand to load the register file wherein the instruction operand defines one of either the normal access mode and the transposed access mode.

11. The processor of claim 1, further comprising an instruction operand to store data which is located in the register file wherein the instruction operand defines one of either the normal access mode and the transposed access mode.

12. The processor of claim 1, wherein the register file further comprises a first pointer and a second pointer and is accessed as a virtual register.

13. The processor of claim 12, wherein an operand written into the virtual register is stored in either one of one row of storage areas or one column of storage areas as determined by the first pointer and the access mode.

14. The processor of claim 12, wherein an operand read from the virtual register is read from either one of one row of storage areas or one column of storage areas as determined by the second pointer and the access mode.

15. The processor of claim 1, wherein there are 'k times n' storage areas per row and said plurality of rows comprises n rows, wherein both n and k are integers greater than 0.

16. A processor for executing instructions, the processor comprising:

a processing unit; and a register file, the register file comprising:

an array of storage areas for storing at least one operand for said instructions, wherein the array is organized into a plurality of rows of storage areas and a plurality of columns of storage areas, each storage area for storing a common plural number of bits, said at least one operand occupying a plurality of storage areas;

a first decoder for selecting all storage areas in an addressed row of storage areas;

a second decoder for selecting all storage areas in an addressed column of storage areas, wherein for any operation of a read operation and a write operation not more than one of either the first decoder and second decoder is active to address storage areas among the array of storage areas; and a third decoder for selecting all storage areas in an addressed row of storage areas;

wherein the first decoder is a read address decoder and the second decoder is a read address decoder, wherein for said read operation only one of the first decoder and second decoder is active to address storage areas among the array of storage areas, and wherein for a write operation the third decoder is active.

17. The processor of claim 16, wherein for the write operation the third decoder is active and none of the first decoder and second decoder are active.

18. A processor for executing instructions, the processor comprising:

a processing unit; and a register file, the register file comprising:

an array of storage areas for storing at least one operand for said instructions, wherein the array is organized into a plurality of rows of storage areas and a plurality of columns of storage areas, each storage area for storing a common plural number of bits, said at least one operand occupying a plurality of storage areas;

a first decoder for selecting all storage areas in an addressed row of storage areas;

a second decoder for selecting all storage areas in an addressed column of storage areas, wherein for any operation of a read operation and a write operation not more than one of either the first decoder and second decoder is active to address storage areas among the array of storage areas; and a third decoder for selecting all storage areas in an addressed column of storage areas;

wherein the first decoder is a read address decoder and the second decoder is a read address decoder, wherein for said read operation only one of the first decoder and second decoder is active to address storage areas among the array of storage areas, and wherein for a write operation the third decoder is active.

19. The processor of claim 18, wherein for the write operation the third decoder is active and none of the first decoder and second decoder are active.

20. A processor for executing instructions, the processor comprising:

a processing unit; and a register file, the register file comprising:

an array of storage areas for storing at least one operand for said instructions, wherein the array is organized into a plurality of rows of storage areas and a plurality of columns of storage areas, each storage area for storing a common plural number of bits, said at least one operand occupying a plurality of storage areas;

a first decoder for selecting all storage areas in an addressed row of storage areas;

a second decoder for selecting all storage areas in an addressed column of storage areas, wherein for any operation of a read operation and a write operation not more than one of either the first decoder and second decoder is active to address storage areas among the array of storage areas;

a third decoder for selecting all storage areas in the addressed row of storage areas; and a fourth decoder for selecting all storage areas in the addressed column of storage areas, wherein for any operation of a read operation and a write operation not more than one of either the first decoder, second decoder, third decoder and fourth decoder is active to address storage areas among the array of storage areas, wherein the first decoder and second decoder are used to transpose 8-bit data and wherein the third decoder and fourth decoder are used to transpose 16-bit data.

21. The processor of claim 20, wherein the first decoder is a read address decoder, the second decoder is a read address decoder, the third decoder is a read address decoder and the fourth decoder is a read address decoder, wherein for an 8-bit read operation only one of the first decoder and second decoder is active to address storage areas among the array of storage areas, wherein for a 16-bit read operation only one of the third decoder and fourth decoder is active to address storage areas among the array of storage areas.

22. The processor of claim 20, wherein the first decoder is a write address decoder, the second decoder is a write address decoder, the third decoder is a write address decoder and the fourth decoder is a write address decoder, wherein for an 8-bit write operation only one of the first decoder and second decoder is active to address storage areas among the array of storage areas, and wherein for a 16-bit write operation only one of the third decoder and fourth decoder is active to address storage areas among the array of storage areas.

23. The processor of claim 20, in which the register file further comprises a fifth decoder for selecting all storage areas in an addressed row of storage areas, wherein for a write operation the fifth decoder is active.

24. A method for executing instructions by a processor having a register file, the register file including a two-dimensional array of storage areas organized into a plurality of rows of said storage areas along a first dimension and a plurality of columns of said storage areas along a second dimension, each one storage area of the array of storage areas comprising a plurality of bits, the method comprising the steps of:

loading during a first access a first data operand into a plurality of storage areas of the a register file along one of either the second dimension or the first dimension using one of a corresponding row-wise access or a corresponding column-wise access to the array of storage areas; and unloading during a second access a second data operand from a plurality of storage areas of the register file using the other one of the second dimension and the first dimension using the corresponding row-wise access or column-wise access to the array of storage areas.

25. The method of claim 24, wherein the step of loading comprises concurrently loading during the first access a first plurality of data operands using row-wise access, said first plurality of data operands comprising the first data operand, wherein each row of the plurality of rows has a capacity of n storage areas, and wherein the step of unloading comprises concurrently unloading during the second access a second plurality of data operands using column wise access, said second plurality of data operands comprising the second data operand, wherein the first access and the second access are not concurrent, wherein each column of the plurality of columns has a capacity of at least n storage areas.

26. A processor for executing instructions, the processor comprising:

a processing unit; and a register file, the register file comprising at least 'k' registers, each one register of the 'k' registers having 'm' partitions, each one partition of the 'm' partitions comprising a plurality of bits, wherein 'k' registers comprise a 'k'×'m' array of partitions;

wherein for a task involving an array transposition, partitions of the register file are loaded using a normal access mode in which a source operand is loaded into a register within the register file, the processing unit performs an operation on the loaded source operand, and partitions of the register file are unloaded using a transposed mode, wherein a result of the task for the source operand is unloaded during transposed mode as a destination operand from a plurality of partitions in the register file spanning a plurality of up to 'k' registers.

27. The processor of claim 26, wherein 'm' equals 'k', and wherein the destination operand is unloaded from a corresponding one partition in each of the plurality of up to 'k' registers.

28. The processor of claim 26, wherein 'm' equals '2k', and wherein the destination operand is unloaded from a corresponding two partitions in each of the plurality of up to 'k' registers.

29. The processor of claim 26 wherein the 'k'×'m' array of partitions comprises 'k' rows and 'm' columns of partitions, and further comprises:

a first decoder for selecting all partitions in an addressed register during the normal access mode; and a second decoder for selecting all partitions in an addressed column of partitions during the transposed access mode, wherein for any operation of a read operation and a-write operation one mode of either the normal access mode and transposed access mode is implemented allowing not more than one of either the first decoder and second decoder to be active during said any operation to address partitions within the register file.

30. A method for executing a task of instructions by a processor having a register file, the register file comprising at least 'k' registers, each one register of the 'k' registers having 'm' partitions, each one partition of the 'm' partitions comprising a plurality of bits, the register file comprising a multidimensional array of 'k'×'m' partitions, the method for executing the task comprising the steps of:

identifying an access mode for a first operation;

loading a source operand into the register file, wherein the source operand spans a plurality of partitions along one dimension of the first and second dimensions of the register file as determined by the access mode for the first operation;

performing a second operation on the source operand;

identifying the access mode for a third operation; and unloading a destination operand from the register file, wherein the destination operand spans a plurality of partitions along one dimension of the first and second dimensions of the register file as determined by the access mode for the third operation.

31. The method of claim 30, wherein 'm' equals 'k', and wherein for a first access mode the first dimension is selected to access a corresponding one partition in each of a plurality of rows of partition.

32. The method of claim 30, wherein 'm' equals '2k', and wherein for a first access mode the first dimension is selected to access a corresponding two partitions in each row of partitions for up to 'k' rows.

33. The method of claim 30, wherein 'm' equals '2k', and wherein for a second access node the second dimension is selected to access partitions along a given row of partitions.

34. The method of claim 30, wherein the register file further comprises a first pointer and a second pointer and is accessed as a virtual register, wherein the step of loading comprises writing the source operand to the virtual register and storing the source operand in either one of one row of partitions areas or one column of partitions as determined by the first pointer and the access mode, and wherein the step of unloading comprises reading the destination operand from the virtual register by accessing either one of one row of storage areas or one column of storage areas as determined by the second pointer and the access mode.

* * * * *